(12) United States Patent
Kelly et al.

(10) Patent No.: US 7,721,061 B1
(45) Date of Patent: May 18, 2010

(54) METHOD OF PREDICTING RESPONSE TIME FOR STORAGE REQUEST

(75) Inventors: Terence P. Kelly, Palo Alto, CA (US); Ira Cohen, Sunnyvale, CA (US); Moises Goldszmidt, Moss Beach, CA (US); Kimberly K. Keeton, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 612 days.

(21) Appl. No.: 11/159,441

(22) Filed: Jun. 22, 2005

(51) Int. Cl.
*G06F 13/00* (2006.01)

(52) U.S. Cl. ............ 711/167; 711/114; 711/E12.016; 709/224; 370/238

(58) Field of Classification Search .......... 711/160; 370/238, 351; 395/650
See application file for complete search history.

(56) References Cited

U.S. PATENT DOCUMENTS

| | | | | |
|---|---|---|---|---|
| 5,452,440 | A * | 9/1995 | Salsburg ............... | 711/136 |
| 5,504,894 | A * | 4/1996 | Ferguson et al. ........... | 707/2 |
| 5,892,957 | A * | 4/1999 | Normoyle et al. ......... | 710/263 |
| 6,026,391 | A * | 2/2000 | Osborn et al. ............. | 707/2 |
| 6,079,028 | A * | 6/2000 | Ozden et al. .............. | 714/6 |
| 6,493,667 | B1 * | 12/2002 | de Souza et al. .......... | 704/240 |
| 6,542,468 | B1 * | 4/2003 | Hatakeyama .............. | 370/238 |
| 6,633,857 | B1 * | 10/2003 | Tipping .................... | 706/16 |
| 2004/0111514 | A1 * | 6/2004 | Chase et al. ............... | 709/226 |
| 2005/0076162 | A1 * | 4/2005 | Tamura et al. ............. | 710/20 |

OTHER PUBLICATIONS

Guillermo A. Alvarez, et al., Minerva: an automated resource provisioning tool for large-scale storage systems, 2001, Palo Alto, CA.

Eric Anderson, HPL-SSP-2001-4: Simple table-based modeling of storage devices, 2001, Hewlett-Packard Laboratories, Palo Alto, CA.

Eric Anderson et al., Hippodrome: running circles around storage administration, Proceedings of the FAST 2002 Conference on File and Storage Technologies, 2002, pp. 175-188, The USENIX Association, Berkeley, CA.

Eitan Bachmat et al., Analysis of Methods for Scheduling Low Priority Disk Drive Tasks, 2002, Beer Sheva, Israel.

John S. Bucy et al., The DiskSim Simulation Environment Version 3.0 Reference Manual, CMU-CS-03-102, 2003, Carnegie Mellon University, Pittsburgh, PA.

William V. Courtright II et al., A Structured Approach to Redundant Disk Array Implementation, Proceedings of the 2nd International Computer Performance and Dependability Symposium (IPDS '96), 1996, pp. 11-20, IEEE Computer Society, Washington D.C.

(Continued)

*Primary Examiner*—Reginald G Bragdon
*Assistant Examiner*—Victor W Wang

(57) ABSTRACT

An embodiment of a method of predicting response time for a storage request begins with a first step of a computing entity storing a training data set. The training data set comprises past performance observations for past storage requests of a storage array. Each past performance observation comprises an observed response time and a feature vector for a particular past storage request. The feature vector includes characteristics that are available external to the storage array. In a second step, the computing entity forms a response time forecaster from the training data set. In the third step, the computing entity applies the response time forecaster to a pending feature vector for a pending storage request to obtain a predicted response time for the pending storage request.

31 Claims, 1 Drawing Sheet

OTHER PUBLICATIONS

Frank Dellaert, The Expectation Maximization Algorithm, 2002, Atlanta, GA.

Chen Ding et al., Predicting Whole-Program Locality through Reuse Distance Analysis, 2003, Rochester, NY.

Pedro Domingos et al., On the Optimality of the Simple Bayesian Classifier under Zero-One Loss, 1997, Machine Learning, 29(2-3):103-130, 1997, Springer Science+Business Media B.V, Berlin, Germany.

John Linwood Griffin et al., Timing-accurate Storage Emulation, Proceedings of the FAST 2002 Conference on File and Storage Technologies, 2002, pp. 75-88, The USENIX Association, Berkeley, CA.

David M. Jacobson et al., Disk scheduling algorithms based on rotational position. Technical Report HPL-CSP-91-7rev1, 1991, Hewlett-Packard Company, Palo Alto, CA.

Terence Kelly et al., Inducing Models of Black-Box Storage Arrays, Technical Report HPL-2004-108, Jun. 25, 2004, Hewlett-Packard Development Company, L.P., Palo Alto, CA.

Christopher R. Lumb et al., Towards Higher Disk Head Utilization: Extracting Free Bandwidth From Busy Disk Drives, 4th Symposium on Operating System Design & Implementation, 2000, pp. 87-102, The USENIX Association, Berkeley, CA.

Christopher R. Lumb et al., Freeblock Scheduling Outside of Disk Firmware, Proceedings of the FAST 2002 Conference on File and Storage Technologies, 2002, The USENIX Association, Berkeley, CA.

J. Gescei et al., Evaluation techniques for storage hierarchies, IBM Systems Journal, 1970, 9(2):78-117, International Business Machines Corporation, White Plains, NY.

Radford M. Neal et al., A View of the EM Algorithm That Justifies Incremental, Sparse, and Other Variants, 1998, Toronto, Ontario, Canada.

Chris Ruemmler et al., An Introduction to Disk Drive Modeling, Computer, 1994, 27(3):17-28, IEEE, New York, NY.

Jiri Schindler et al., Automated Disk Drive Characterization, CMU-CS-99-176, 1999, Carnegie Mellon University, Pittsburgh, PA.

Jiri Schindler et al., Track-aligned Extents: Matching Access Patterns to Disk Drive Characteristics, Proceedings of the FAST 2002 Conference on File and Storage Technologies, 2002, pp. 259-274, The USENIX Association, Berkeley, CA.

Margo Seltzer et al., Disk Scheduling Revisited, Proceedings of the USENIX Winter 1990 Technical Conference, 1990, pp. 313-323, The USENIX Association, Berkeley, CA.

Elizabeth Shriver et al., An analytic behavior model for disk drives with readahead caches and request reordering, 1998, Palo Alto, CA.

Mustafa Uysal et al., A Modular, Analytical Throughput Model for Modern Disk Arrays. Ninth International Symposium on Modeling, Analysis and Simulation of Computer and Telecommunication Systems (MASCOTS-2001), 2001, pp. 183-192, IEEE Computer Society, Washington D.C.

Elizabeth Varki et al., An integrated performance model of disk arrays, 2003, Durham, NH.

John Wilkes, The Pantheon storage-system simulator, Technical Report HPL-SSP-95-14 revision 1, 1996, Hewlett-Packard Company, Palo Alto, CA.

Ian H. Witten et al., Data Mining: Practical Machine Learning Tools and Techniques with Java Implementations, 2000, Academic Press, San Diego, CA.

Bruce L. Worthington et al., On-Line Extraction of SCSI Disk Drive Parameters, Technical Report HPL-97-02, 1997, Hewlett-Packard Company, Palo Alto, CA.

* cited by examiner

METHOD OF PREDICTING RESPONSE TIME FOR STORAGE REQUEST

FIELD OF THE INVENTION

The present invention relates to the field of data storage. More particularly, the present invention relates to the field of data storage where there is a need for a prediction of response time for a storage request.

BACKGROUND OF THE INVENTION

Enterprise storage systems are increasingly hard to manage. Today's high-end storage arrays are complex and highly configurable, and therefore inherently difficult to reason about. Furthermore the trend toward storage consolidation in large data centers means that a single "black box" storage array can serve a variety of very different workloads. The mapping from fundamental device capabilities, configuration, and workload to performance often defies manual analysis by human experts, and researchers have therefore begun to automate tasks such as capacity planning and configuration. This approach centralizes performance modeling, but the construction of performance models remains challenging. State-of-the-art approaches rely heavily on expert analysis, but it is difficult for human analysts to keep pace with increasingly elaborate and often proprietary enterprise storage architectures. Enterprise storage trends call for modeling strategies that are more automated, less reliant on human expertise, and applicable to opaque devices.

A storage array is a complex device that typically includes a collection of disks, a controller, and one or more caches. An enterprise storage array is a more complex device that typically includes a plurality of groups of independent disks, a read cache for each group of independent disks, a controller, a non-volatile cache for write data, a high-speed internal interconnect architecture, and several client host interface processors for receiving and responding to storage requests.

Existing methods for storage system performance modeling are not suited to forecasting response times of individual requests for storage arrays and, in particular, for enterprise storage arrays. Analytic models predict average performance (e.g., mean throughput, mean response time) from parametric workload descriptions (e.g., mean request rate, read:write ratio). Simulation models can generate storage request response time predictions but require calibration and a tool for performing the calibrations is available only for disk drives; nothing analogous exists for storage arrays and, in particular, for enterprise storage arrays.

SUMMARY OF THE INVENTION

The present invention comprises a method of predicting response time for a storage request. According to an embodiment, the method begins with a first step of a computing entity storing a training data set. The training data set comprises past performance observations for past storage requests of a storage array. Each past performance observation comprises an observed response time and a feature vector for a particular past storage request. The feature vector includes characteristics that are available external to the storage array. In a second step, the computing entity forms a response time forecaster from the training data set. In a third step, the computing entity applies the response time forecaster to a pending feature vector for a pending storage request to obtain a predicted response time for the pending storage request.

These and other aspects of the present invention are described in more detail herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT

Figure 1:
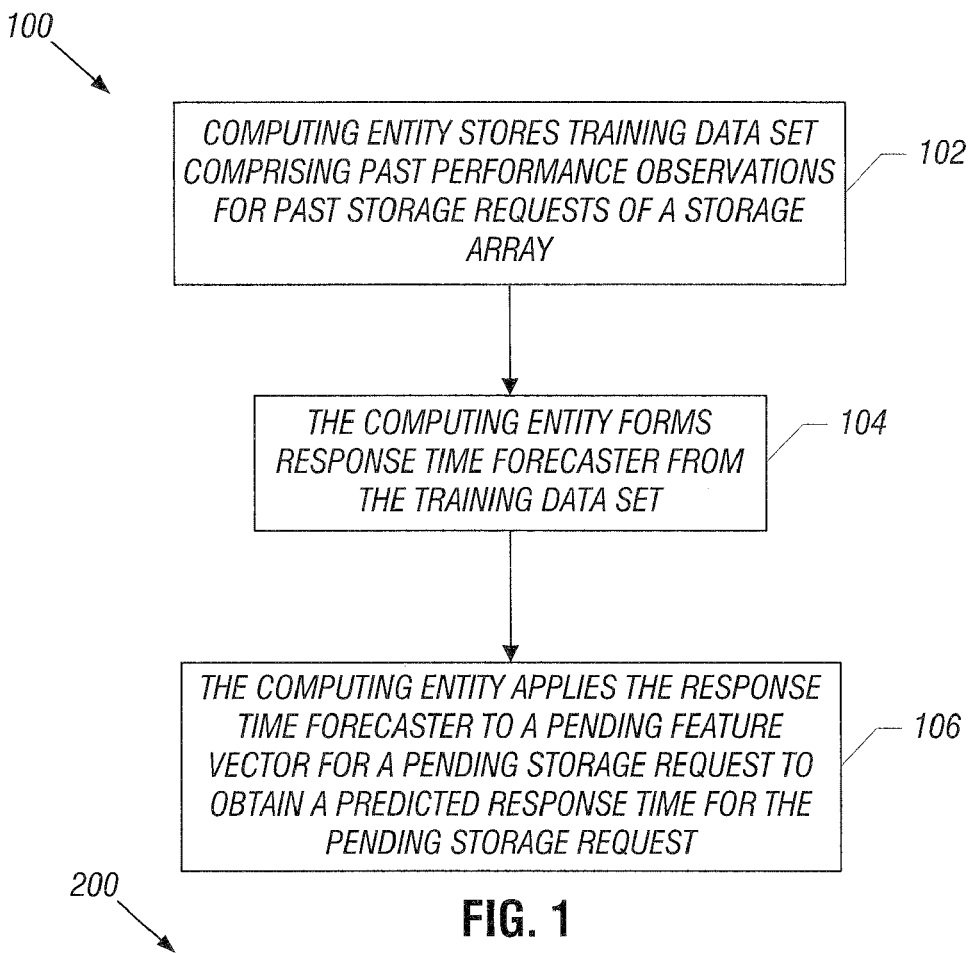
FIG. 1 illustrates an embodiment of a method of predicting response time for a storage request of the present invention as a flow chart.

An embodiment of a method of predicting response time for a storage request is illustrated as a flow chart in FIG. 1. The method 100 begins with a first step 102 of a computing entity storing a training data set comprising past performance observations for past storage requests of a storage array. The computing entity may be a stand alone computer or some other computing entity such as two or more computers that communicate over a network. In an embodiment, the storage array is an enterprise storage array. Each past performance observation includes an observed response time and a feature vector for a particular past storage request. The observed response time is the time to satisfy the past storage request. The feature vector includes characteristics that are available external to the storage array.

Figure 2:
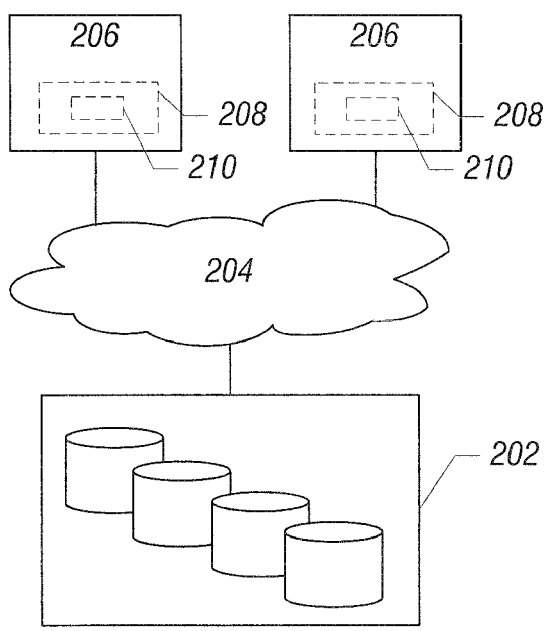
FIG. 2 illustrates a storage system which employs a method of predicting response time for a storage request in accordance with an embodiment of the present invention.

An embodiment of a storage system that employs an embodiment of a method of predicting response times of the present invention is illustrated schematically in FIG. 2. The storage system 200 includes the storage array 202, a SAN (storage area network) 204, and hosts 206. The SAN 204 couples the hosts 206 to the storage array 202. In operation, the hosts issue storage requests to the storage array 202. The storage requests may include read requests or write requests or both.

An embodiment of the method 100 (FIG. 1) considers the storage array 202 (FIG. 2) as a "black box" that has available external characteristics but lacks availability of internal characteristics. Storage arrays typically include a number of disks, a volatile cache for caching read-data, a non-volatile cache for caching write-data, and a controller. Under typical conditions four factors dominate performance of the storage array. The first factor is queuing time in the disks and in the array controller. The second factor is caching time in the volatile and non-volatile caches. The third factor is seeking time to align read/write heads in the disks. And, the fourth factor is rotation time of platters in the disks. Typically, while average estimates may be available, particular estimates for the queuing time, the caching time, the seeking time, and the rotation time for a particular request are unavailable from outside of the storage array. Observations at hosts (e.g., the hosts 206) served by a storage array (e.g., a simple storage array or an enterprise storage) are used to predict response time.

The feature vector may include a plurality of characteristics. The characteristics may be chosen from request characteristics, storage array state characteristics, relational characteristics, and storage array configuration characteristics. The request characteristics may include a requested object size (i.e., the amount of data requested). The storage array state characteristics may include a number of pending requests and pending request sizes. The relational characteristics relate the past storage request to one or more earlier storage requests and may include a locality of reference characteristic. The locality of reference characteristic may model an LRU (least recently used) stack distance. Or, the locality of reference characteristic may model another locality measure such as an inter-reference distance. The storage array configuration characteristics may include a location of a logical unit within the storage array that holds data for the storage request. For example, each logical unit of an enterprise storage array may reside within a group of independent disks and, in such a situation, identifying the location of the logical unit as the particular group of disks that holds the data for the storage request may improve a predicted response time.

In a second step 104 (FIG. 1), the computing entity forms a response time forecaster from the training data set. In an embodiment, the response time forecaster employs a probability model. The probability model may be a regression probability model or it may be a classification probability model or another probability model such as logistic regression. In another embodiment, the response time forecaster employs a model other than a probability model such as non-probability regression model, a support vector machine, or a neural network. The regression probability model may determine a mixture of regressions. For example, a mixture of regressions may be determined using an expectation maximization technique.

The probability models address the problem of modeling storage arrays as "black-boxes." The problem may be more formally described as follows. Let $\vec{X}$ represent a vector of features describing a storage request. The feature vector may include several kinds of information: characteristics of the request itself, e.g., the amount of data requested; information about the state of the storage array, e.g., the number of unfulfilled requests within it; and features that relate the current request to earlier ones, e.g., measures of reference locality. Let $P^*(t_r|\vec{X})$ denote the conditional distribution of an individual request's response time $t_r$ given the information contained in $\vec{X}$. A distribution is used to characterize response time $t_r$ because $\vec{X}$ components available via observation of black-box devices do not completely describe all aspects of system state relevant to the response time $t_r$. A probability distribution can capture the uncertainty inherent in this situation, and also uncertainty arising from sampling and measurement errors. Each value of $\vec{X}$ defines a probability distribution over a continuous range of possible response times, which can be computed for a given $\vec{X}$ and $P^*$ or some approximation thereof. Finally, note that it is straightforward to collapse any distribution over continuous $t_r$ values into a binary forecast ("fast" vs. "slow") by simply considering probability mass above and below a threshold on $t_r$. The probability models produce an approximation $P(t_r|\vec{X})$ of $P^*(t_r|\vec{X})$ from the past performance observations $(t_r, \vec{X})$.

A starting point for the probability models is an unconditional prior distribution of response times $P(t_r)$. A locality feature may be added to the unconditional prior distribution $P(t_r)$ as follows. The locality feature may approximate the size of a smallest LRU cache in which every block accessed in a request would be a hit (i.e., found in the cache). A significant difference in response time is expected between a storage request that requires a transfer from disk versus one that is satisfied by a cache. High-locality requests may tend to hit more often than low-locality requests.

A regression probability model may be described as follows. Let L denote a locality feature (e.g., an approximation of locality). In order to account for the uncertainty surrounding this feature, a "hidden state" j is added, which models the likelihood that a cache hit occurs somewhere in a storage array given L (e.g., array cache hit, disk cache hit). The variable j is "hidden" because a direct observation of its state is not available. A probability of a response time $t_r$ may be expressed mathematically by equation (1).

$$P(t_r | L) = \sum_j P(t_r | L, j) \times P(j | L) \quad (1)$$

Since there is a summation over possible states of j, the equality is valid. Equation (1) may be further simplified by noting that once the state of j (e.g., whether there is a cache hit and, if so, in what cache it is to be found) is known, the knowledge of response time $t_r$ is not affected by the evidence provided by the L variable. In other words, the response time $t_r$ is probabilistically independent of L given j, which may be expressed mathematically by equation (2).

$$P(t_r | L) = \sum_j P(t_r | j) \times P(j | L) \quad (2)$$

Equation (2) may be interpreted as follows. The probability of a response time depends on whether the request was a cache hit (i.e., given by j) weighted by the probability that a hit occurred given the evidence in L.

The number of states of j may be determined using an expectation maximization technique. The expectation maximization technique is an iterative algorithm similar to gradient ascent; it searches over a given likelihood function to obtain a maximum. Informally, the algorithm proceeds as follows. The algorithm is initialized to a model represented by a (possibly arbitrary) probability distribution $P_0$. The algorithm then uses $P_0$ to compute the expected states for j in each sample of the training data set. Then, the algorithm uses this updated sample set to compute an updated model P', and alternately updates data and model until a fixed point is reached. This fixed point is a point of locally maximal likelihood (i.e., the final model presents a maximum likelihood to have generated the observed set of samples). The final state depends on the starting point, as well as on the shape of the likelihood function. The starting point $P_0$ may be based upon a straightforward linear regression over the training data set, informed by the variable L. An informed starting point should accelerate convergence. To address the issue of local optima, the solutions are perturbed and the expectation maximization technique is restarted from neighboring points.

The number of states for j may be determined by performing a search, starting with two states and increasing the number of states, and looking for results that yield a maximum likelihood. In order to regularize the maximum likelihood score and avoid over fitting, results may be plotted and the number of states may be selected such that the gain in likelihood (i.e., a first derivative) starts to decrease significantly. Regularization avoids producing a number of states j that is equal to the number of points in the data. Other regularization techniques may also be employed.

Distributions for P(j|L) may use multinomials since both j and L are discrete variables. A standard maximum likelihood method may be used for fitting parameters, which in this case may reduce to appropriate frequency counts on the states of j divided by the states of L. The distributions P($t_r$|j) may be modeled by Gaussian distributions.

The probability model may be further refined by providing it with the full feature vector $\vec{X}$, which includes the number of blocks read and the number and total size of requests pending in the storage array. Mathematically, this may be given by equation (3), which augments equation (2) with the feature vector $\vec{X}$.

$$P(t_r \mid L, \vec{X}) = \sum_j P(t_r \mid j, \vec{X}) \times P(j \mid L, \vec{X}) \quad (3)$$

Again, assuming that $\vec{X}$ contains no information pertinent to the relation between j and L (i.e., assuming statistical independence between j and $\vec{X}$ given L) equation (3) may be rewritten as equation (4).

$$P(t_r \mid L, \vec{X}) = \sum_j P(t_r \mid j, \vec{X}) \times P(j \mid L). \quad (4)$$

A standard least squares regression may be fitted for each member of P($t_r$|j, $\vec{X}$).

A classification probability model may distinguish between modes of operation, by identifying statistically significant distributions or by arbitrarily defined classes. For example, in tests conducted on Hewlett-Packard XP 512 enterprise storage array, a histogram of response times indicated five "humps;" an application of a regression probability model employing the expectation maximization technique and this data provided five modes of operation (i.e., five statistically significant distributions. A particular classification probability model may distinguish between fast and slow response times (i.e., two arbitrarily defined modes of operation). Here, response time $t_r$ is a discrete variable that takes two values $t_r^+$ and $t_r^-$, which denote fast and slow respectively. Mathematically, this may be expressed by equation (5).

$$\log \frac{P(t_r^+ \mid \vec{X}, L)}{P(t_r^- \mid \vec{X}, L)} + d \geq 0 \quad (5)$$

were d is a threshold. Equation (5) provides that, if d=0 and P($t_r^+$|$\vec{X}$,L)≧P($t_r^-$|$\vec{X}$,L), then the response time will be fast. The threshold d, denoting how much more probable one response time has to be in order to be selected can be adjusted according to criteria such as minimizing false-positives. The conditional distributions of equation (5) may be fitted using Bayes rule. Mathematically, the conditional probabilities may be given by equation (6) and a similar equation for P($t_r^-$|$\vec{X}$,L).

$$P(t_r^+ \mid \vec{X}, L) = P(\vec{X}, L \mid t_r^+) \times \frac{P(t_r^+)}{P(\vec{X}, L)} \quad (6)$$

Assuming that members $x_i$ of $\vec{X}$ are independent of each other given the state of $t_r$ and making the appropriate substitutions in equation (5) may provide equation (7).

$$\log \frac{P(t_r^+ \mid \vec{X}, L)}{P(t_r^- \mid \vec{X}, L)} = \sum_i \log \frac{P(x_i \mid t_r^+)}{P(x_i \mid t_r^-)} + \log \frac{P(L \mid t_r^+)}{P(L \mid t_r^-)} + \log \frac{P(t_r^+)}{P(t_r^-)} \quad (7)$$

Equation (7) evaluates the decision as a linear combination in logspace of the contribution of each feature in $\vec{X}$ and L. This is a "naive-Bayes classifier." The assumption of independence may be unrealistic, but this classifier has a number of advantages. First it is very robust to noise in the data. As a consequence, it works well in high dimensional spaces. Note that statistically the probability model here employs a high dimensional space (i.e., fitting a conditional distribution on $\vec{X}$ and $t_r$) coalesced into a number of small dimensional spaces, where univariate distributions are fitted. The assumption of independence may result in a probability that is not the exact probability but is sufficiently accurate for purposes of the present invention. For example, it may be used to find a separating surface between multiple regions and in particular between the two regions of $t_r^+$ and $t_r^-$ (i.e., fast and slow). A more sophisticated model may be employed, which removes this assumption of independence by, for example, fitting a full covariance matrix.

In an embodiment, the second step 104 (FIG. 1) may be preceded by a step (not shown) of removing anomalous past performance observation from the training data set. Employing a probability model based upon external characteristics may result in one or more particular feature vectors $\vec{X}$ that each provides a wide range of response times. Removing these particular anomalous feature vectors $\vec{X}$ from the training data set may produce a better response time forecaster. If or when the particular anomalous feature vectors appear as a pending request, a response time forecast may determined in some other way such as providing the average of the past performance response times for the particular feature vector.

In a third step 106 (FIG. 1), the computing entity applies the response time forecaster to a feature vector for a pending storage request to obtain a predicted response time for the pending storage request. Application of the response time forecaster to the pending feature vector may provide a response time value. Alternatively, it may provide a response time class (e.g., the pending request is expected to be slow or fast) or it may provide a distribution over possible response times.

In an embodiment, the third step 106 is performed for a group of storage requests being issued at or near a point-in-time in order to schedule the order of related processor tasks for the group.

For example, the response time for a group of storage requests at or near a point-in-time may be used for scheduling of processor tasks involved in providing compound Web pages by a Web server which involve storage requests from a storage array. Each screen of material for a compound Web page may be assembled from a variety of components (e.g., static images and dynamically-generated HTML). Some of the corresponding HTTP requests primarily require storage requests while others mainly require processor time. The requests for Web pages may arrive at the Web server simultaneously via HTTP's pipelining feature and all of them may be served in parallel. In such situations, where transactions decompose naturally into processor and storage request components that may be served concurrently, response time estimates for storage requests may be used to improve processor scheduling and, thereby, obtain lower mean transaction times.

Or, for example, consider two computing operations each of which has a storage request component and a processor component that may be executed in parallel with the storage request. Both operations arrive (i.e., become available for processing) at time t=0. The first computing operation has an expected processing time of 500 μs for the processor component and a predicted storage request response time of 1,500 μs, the latter of which is determined according to an embodiment of the present invention. The second computing operation has an expected processor response time of 1,000 μs for the processor component and a predicted storage request response time of 1,000 μs, the latter of which is determined according to an embodiment of the present invention.

In this example, processor scheduling may be controlled, but the behavior of the storage device cannot be controlled. So, the storage request components of both computing operations are dispatched at t=0, because no advantage is gained by withholding the storage requests for any length of time. The problem is to schedule the processor components of the two operations while waiting for the storage requests to return. The goal is to complete both computing operations as quickly as possible; for instance, the goal might be to minimize the average completion time of both computing operations.

If the processor executes the processor component of the first computing operation first (at t=0), the processor will likely receive data for the storage request component of the first computing operation at t=1,500 μs and therefore the first computing operation will complete at t=1,500 μs. The processor will begin to execute the processor component of the second computing operation at t=500 μs and will finish executing it at t=1,500 μs. Therefore the second computing operation will complete at t=1,500 μs (its storage request component completed at 1,000 μs). In this scenario, in which the processor components are scheduled according to a "shortest processor task first" policy, the average completion time is (1,500 μs+1,500 μs)/2=1,500 μs.

On the other hand, if the processor executes the processor component of the second computing operation first, the processor will likely receive data for the second storage request component at about the time it completes processing at t=1,000 μs; the processor may then execute the processor component of the first computing operation and will likely receive data for the storage request component of the first computing operation at about the time it completes processing the first processor component at t=1,500 μs. In this scenario, average completion time for the two computing operations is (1,000 μs+1,500 μs)/2=1,250 μs. Employing forecasted response times for the storage request components achieves better performance than the "shortest processor task first" scheduling policy, which is a reasonable policy to use if estimates of storage request response times are not available.

In an embodiment, the third step 106 is performed iteratively for a series of pending storage requests to determine a series of predicted response times. The series of predicted response times and actual response times may be monitored so that anomalies indicating problems with the storage array may be detected. Monitoring predicted response times versus actual response times may help to discover deviations from expected system behavior. If the predictive accuracy of the response time forecaster changes quickly and dramatically, standard statistical tests can determine whether the change is due to random fluctuations in workload or to a more fundamental change in behavior (e.g., an internal storage array failure).

Referring to FIG. 2, in accordance with embodiments of the invention, a computer readable medium 208 includes computer code 210 for implementing a method of predicting response time for a storage request. The method of predicting the response time includes storing a training data set including past performance observations for past storage requests of an enterprise storage array. Each past performance observation includes an observed response time and a feature vector for a particular past storage request. The feature vector includes characteristics that are available to the storage array, which include a requested object size, number of pending requests and a locality of reference characteristic. The method of predicting the response time also includes forming a response time forecaster from the training data set, which includes applying a probability model to the training data sets; and applying the response time forecaster to a pending feature vector for a pending storage request to obtain a predicted response time for the pending storage request.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of predicting response time for a storage request comprising the steps of:
   a computing entity:
      storing a training data set comprising past performance observations for past storage requests of a storage array, each past performance observation comprising an observed response time and a feature vector for a particular past storage request, the feature vector comprising characteristics that are available external to the storage array, and the feature vector including a locality feature that relates the particular past storage request to one or more earlier storage requests;
      forming a response time forecaster from the training data set, which includes applying a probability model to the training data set, where the probability model models a likelihood of a cache hit dependent upon the locality feature; and
      applying the response time forecaster to a pending feature vector for a pending storage request to obtain a predicted response time for the pending storage request, wherein the predicted response time is based on the likelihood of a cache hit.

2. The method of claim 1 wherein the computing entity is a computer.

3. The method of claim 1 wherein the computing entity is a plurality of computers.

4. The method of claim 1 wherein the storage array is an enterprise storage array.

5. The method of claim 1 wherein the characteristics include one or more request characteristics.

6. The method of claim 5 wherein the one or more request characteristics include a requested object size.

7. The method of claim 1 wherein the characteristics include one or more storage array state characteristics.

8. The method of claim 7 wherein the one or more storage array state characteristics are selected from a number of pending requests, pending request sizes, and a combination thereof.

9. The method of claim 1 wherein the characteristics include one or more additional characteristics that relate the past storage request to one or more earlier storage requests.

10. The method of claim 1 wherein at least one of the characteristics models a least recently used stack distance.

11. The method of claim 1 wherein at least one of the characteristics models an inter-reference distance.

12. The method of claim 1 wherein the characteristics include one or more storage array configuration characteristics.

13. The method of claim 12 wherein storage array configuration characteristics include a location of a logical unit within the storage array that holds data for the particular past storage request.

14. The method of claim 1 wherein the past storage requests include read requests.

15. The method of claim 1 wherein the past storage requests include read and write requests.

16. The method of claim 1 wherein the probability model includes a regression analysis of the training data set.

17. The method of claim 16 wherein the regression analysis includes a mixture of regressions.

18. The method of claim 17 wherein a number of regressions is determined using an expectation maximization technique.

19. The method of claim 1 wherein the probability model includes a classification analysis of the training data set.

20. The method of claim 1 wherein the step of applying the response time forecaster to the pending storage request to obtain the predicted response time provides a response time value.

21. The method of claim 1 wherein the step of applying the response time forecaster to the pending storage request to obtain the predicted response time provides a response time class.

22. The method of claim 21 wherein the response time class is selected from a plurality of possible response time classes.

23. The method of claim 1 wherein the step of applying the response time forecaster to the pending storage request to obtain the predicted response time provides a distribution over possible response times.

24. The method of claim 1 further comprising removing anomalous past performance observations from the training data set prior to the step of forming the response time forecaster.

25. The method of claim 1 wherein the pending storage request and the predicted response time are a first pending storage request and first predicted response time, respectively, and further comprising applying the response time forecaster to a second pending feature vector for a second pending storage request to obtain a second predicted response time for the second pending storage request, and wherein the method further comprises scheduling an order of the first and second pending storage requests for optimal system response.

26. The method of claim 1 further comprising iteratively applying the response time forecaster to a next pending feature vector for a next pending storage request to obtain a next predicted response time for the next pending storage request, thereby determining a series of predicted response times.

27. The method of claim 26 further comprising monitoring the series of predicted response times versus actual response times.

28. The method of claim 27 further comprising detecting an anomaly in the actual response times relative to the predicted response times.

29. A method of predicting response time for a storage request comprising the steps of:
a computing entity:
storing a training data set comprising past performance observations for past storage requests of an enterprise storage array, each past performance observation comprising an observed response time and a feature vector for a particular past storage request, the feature vector comprising characteristics that are available external to the storage array which include a requested object size, number of pending requests, and a locality of reference characteristic, wherein the locality of reference characteristic relates the particular past storage request to one or more earlier storage requests;
forming a response time forecaster from the training data set which includes applying a probability model to the training data set, wherein the probability model models a likelihood of a cache hit dependent upon the locality of reference characteristic; and
applying the response time forecaster to a pending feature vector for a pending storage request to obtain a predicted response time for the pending storage request, wherein the predicted response time is based on the likelihood of a cache hit.

30. A computer readable medium comprising computer code for implementing a method of predicting response time for a storage request, the method of predicting the response time comprising the steps of:
storing a training data set comprising past performance observations for past storage requests of a storage array, each past performance observation comprising an observed response time and a feature vector for a particular past storage request, the feature vector comprising characteristics that are available external to the storage array, and the feature vector including a locality feature that relates the particular past storage request to one or more earlier storage requests;
forming a response time forecaster from the training data set, which includes applying a probability model to the training data set, wherein the probability model models a likelihood of a cache hit dependent upon the locality feature; and
applying the response time forecaster to a pending feature vector for a pending storage request to obtain a predicted response time for the pending storage request, wherein the predicted response time is based on the likelihood of a cache hit.

31. A computer readable medium comprising computer code for implementing a method of predicting response time for a storage request, the method of predicting the response time comprising the steps of:
storing a training data set comprising past performance observations for past storage requests of an enterprise storage array, each past performance observation comprising an observed response time and a feature vector for a particular past storage request, the feature vector comprising characteristics that are available external to the storage array which include a requested object size, number of pending requests, and a locality of reference characteristic, wherein the locality of reference characteristic relates the particular past storage request to one or more earlier storage requests;
forming a response time forecaster from the training data set which includes applying a probability model to the training data set, wherein the probability model models a likelihood of a cache hit dependent upon the locality of reference characteristic; and applying the response time forecaster to a pending feature vector for a pending storage request to obtain a predicted response time for the pending storage request, wherein the predicted response time is based on the likelihood of a cache hit.

* * * * *

UNITED STATES PATENT AND TRADEMARK OFFICE
CERTIFICATE OF CORRECTION

| | |
|---|---|
| PATENT NO. | : 7,721,061 B1 |
| APPLICATION NO. | : 11/159441 |
| DATED | : May 18, 2010 |
| INVENTOR(S) | : Terence P. Kelly et al. |

It is certified that error appears in the above-identified patent and that said Letters Patent is hereby corrected as shown below:

In column 8, line 48, in Claim 1, delete "where" and insert -- wherein --, therefor.

Signed and Sealed this

Ninth Day of November, 2010

David J. Kappos
*Director of the United States Patent and Trademark Office*